H. A. SHAW.
VEHICLE CHOCK.
APPLICATION FILED MAR. 10, 1915.
1,229,535.
Patented June 12, 1917.
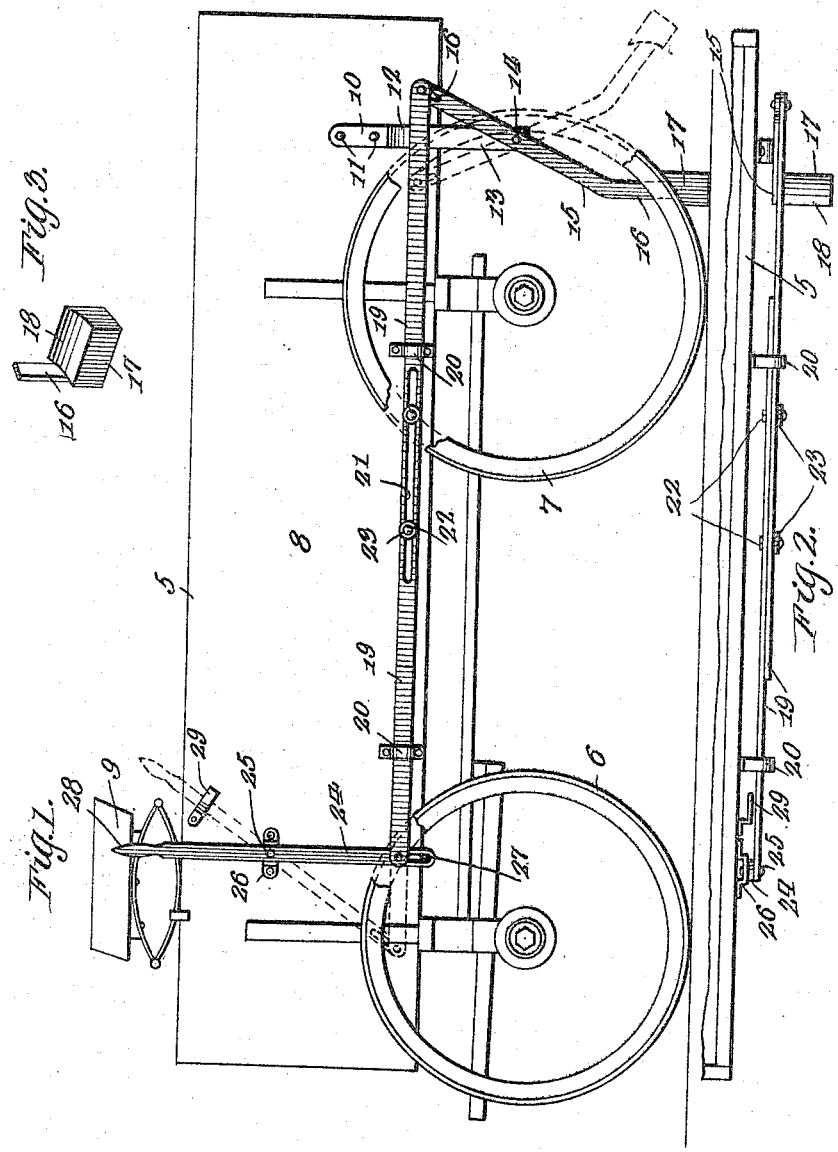
Witnesses
Guy M. Spring.
Inventor
Howard A. Shaw.
By Richard Owen.
Attorney

UNITED STATES PATENT OFFICE.

HOWARD A. SHAW, OF YONKERS, NEW YORK.

VEHICLE-CHOCK.

1,229,535.

Specification of Letters Patent.   Patented June 12, 1917.

Application filed March 10, 1915.   Serial No. 13,458.

*To all whom it may concern:*

Be it known that I, HOWARD A. SHAW, a citizen of the United States, residing at Yonkers, in the county of Westchester and State of New York, have invented certain new and useful Improvements in Vehicle-Chocks, of which the following is a specification.

This invention relates to means for chocking the wheels of vehicles and is particularly applicable when the vehicle equipped therewith is stopping upon a hill or grade in order to relieve the draft animals of strain.

As a principal object, it is contemplated by this invention to provide a simple mechanism operable from the seat of the driver and adjustable to various lengths of wagon box to constitute an effective means of preventing retrograde movements of the vehicle.

A coördinate object is to provide a chock of such character that it may be readily operated by the driver of the vehicle in being moved into its operative or inoperative positions and one which may be locked in the latter position to prevent accidental engagement with the ground when the vehicle is moving.

The above and additional objects which will become apparent as this explanatory description proceeds, are accomplished by such means as are illustrated in the accompanying drawings, described in the following specification and then more particularly pointed out in the claim which is appended hereto and forms a part of this application.

With reference to the drawings, wherein there is illustrated the preferred embodiment of this invention as it is reduced to practice, and throughout the several views of which like characters of reference designate similar parts:

Figure 1 is an elevational view of a wagon equipped with the chock of this invention and the operative means therefor.

Fig. 2 is a partial plan of the subject-matter of Fig. 1, and

Fig. 3 is a detail perspective of the chock *per se.*

The chock of this invention being applicable to any vehicle, there is illustrated a type wagon 5 having the front and rear wheels 6 and 7 respectively and being provided with the usual body 8 and driver's seat 9. In applying the chocking mechanism to a wagon, there is employed a bracket 10 secured as indicated by means 11 to the rearward portion of the side of the wagon body 8, such bracket or hanger being outwardly bent as shown by the numeral 12 in order to space the lower dependent extremity 13 outwardly from the plane of the wagon side.

Upon this extremity is mounted by means of an intermediate pivot 14 the chock lever 15, one extremity of which is provided with the slots 16 to make lost motion connections with the operating means to be hereinafter set forth, while the opposite and lower extremity of this lever extends angularly to the main portion thereof in order to be in a substantially vertical position when the chock is operatively associated with the rear wheel 7, as shown in the full lines of Fig. 1. This angular lever extremity 16 carries the chocking block 17 at its lowermost extremity, such chock being of a suitable width to extend beyond the periphery of the rear wheel with which it is designed to contact and the upper face 18 of this block is arcuately formed to correspond to the curvature of the rear wheel while its lower face is squared for contact with the ground.

The operating means for actuation of the lever includes a pair of overlappingly associated bars 19 slidable through brackets 20 carried by the wagon body 8 formed with registering interior slots 21 near adjacent extremities through which slots pass bolts 22, the ends of which may be equipped with washers 23 in order to form an adjustable connection between the chocking lever 15 and the controlling lever 24.

This latter is also intermediately pivoted by a pin 25 to a supporting angle plate 26 which is secured by suitable fastening means to the side 8 at some point adjacent the driver's seat 9, and is also formed at one extremity with a slot 27 permitting lost motion connection with the adjacent link 19 while the upper end is formed with a handle 28. The movements of the levers have been illustrated in the dotted lines of Fig. 1 and a catch 29 has been shown as carried upon the side of the wagon box in such a manner as to maintain the lever 24 in its inoperative position. This catch projects in an L-shaped manner from the wagon box and at such a distance that the lever 24 must be forced slightly out of the vertical to pass the same to permit which the pivot 25 is preferably not too strictly tightened.

In operation, it may be noted that a rearward pull upon the handle of the operating lever 24 from the full lines until such lever may be engaged within the catch 29 will withdraw the chocking block into the inoperative position illustrated while a reversal of this movement will permit the block 17 to engage similarly between the periphery of the rear wheel and the ground and will thus form a substantial bar to any retrograde movement when the vehicle is standing upon a slope. The bars 19 are adjustable so that the entire mechanism may be applied to wagon boxes of various lengths and also in order to permit of the amount of contact between the block and the wheel to be properly varied to secure the best results. A suitable stop may be provided for the lever 24 if it is desired to prevent any movement thereof forwardly from the vertical although this is hardly necessitated since the engagement of the block 17 with both the wheel and the ground prevents any strain from being placed upon this lever. By forming the lever 15 with an angular extremity, it is possible to maintain the chock at such an inoperative position that there is small danger of contact with any obstructions in the road which may be passed over by the vehicle, by the minimum movement of the lever 24.

While in the foregoing however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claim.

What is claimed is:—

In a vehicle chock, a hanger adapted to be secured to the side of the vehicle body and to depend therefrom near the rear of said body, said hanger being offset, an angular lever intermediately pivoted on the lower end of said hanger, a chock carried by the angular portion of said lever for insertion between the vehicle wheel and the ground, a bracket attached to the sides of the body at the forward portion thereof, an operating lever intermediately pivoted to said bracket and having a slotted lower end, guide-brackets attachable to the sides of the body along the lower edge thereof, rods connected through the slots of the levers and having longitudinal slots near their inner ends, said ends overlapping to aline the slots, adjustable clamping means engaged through the slots for holding said rods in longitudinally adjusted positions to vary the length thereof and a catch to hold the operating lever in an inoperative position when pulled rearwardly to disengage the chock from between the wheel and the ground.

In testimony whereof I affix my signature in presence of two witnesses.

HOWARD A. SHAW.

Witnesses:
JOE KAPLAN,
C. W. FLOYD.

Copies of this patent may be obtained for five cents each, by addressing the "Commissioner of Patents, Washington, D. C."